US010158702B2

(12) United States Patent
Bloch et al.

(10) Patent No.: US 10,158,702 B2
(45) Date of Patent: *Dec. 18, 2018

(54) NETWORK OPERATION OFFLOADING FOR COLLECTIVE OPERATIONS

(71) Applicant: MELLANOX TECHNOLOGIES LTD., Yokneam (IL)

(72) Inventors: Noam Bloch, Bat Shlomo (IL); Gil Bloch, Zichron Yaakov (IL); Ariel Shahar, Jerusalem (IL); Hillel Chapman, Ramot Hashofet (IL); Gilad Shainer, Pardes Hana-Karkur (IL); Adi Menachem, Hod Hasharon (IL); Ofer Hayut, Kvutzat Yavne (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 147 days.

This patent is subject to a terminal disclaimer.

(21) Appl. No.: 14/937,907

(22) Filed: Nov. 11, 2015

(65) Prior Publication Data

US 2016/0065659 A1    Mar. 3, 2016

Related U.S. Application Data

(63) Continuation-in-part of application No. 14/324,246, filed on Jul. 7, 2014, now Pat. No. 9,344,490, which is a continuation of application No. 12/945,904, filed on Nov. 15, 2010, now Pat. No. 8,811,417.

(60) Provisional application No. 61/261,339, filed on Nov. 15, 2009.

(51) Int. Cl.
*H04L 29/08*    (2006.01)
*G06F 9/54*    (2006.01)

(52) U.S. Cl.
CPC .............. *H04L 67/10* (2013.01); *G06F 9/546* (2013.01); *G06F 2209/509* (2013.01)

(58) Field of Classification Search
CPC ..... G06F 9/546; G06F 2209/509; H04L 67/10
See application file for complete search history.

(56) References Cited

U.S. PATENT DOCUMENTS 5,325,500 A * 6/1994 Bell .......................... G06F 9/38
                                                        711/157
5,353,412 A   10/1994 Douglas et al.
5,404,565 A    4/1995 Gould et al.
(Continued)

OTHER PUBLICATIONS

U.S. Appl. No. 14/324,246 Office Action dated Sep. 11, 2015.
U.S. Appl. No. 15/250,953 Office Action dated Feb. 15, 2018.
U.S. Appl. No. 15/250,953 Office Action dated Nov. 2, 2018.

*Primary Examiner* — Peter P Chau
(74) *Attorney, Agent, or Firm* — D. Kligler IP Services Ltd.

(57) ABSTRACT

A Network Interface (NI) includes a host interface, which is configured to receive from a host processor of a node one or more work requests that are derived from an operation to be executed by the node. The NI maintains a plurality of work queues for carrying out transport channels to one or more peer nodes over a network. The NI further includes control circuitry, which is configured to accept the work requests via the host interface, and to execute the work requests using the work queues by controlling an advance of at least a given work queue according to an advancing condition, which depends on a completion status of one or more other work queues, so as to carry out the operation.

22 Claims, 4 Drawing Sheets

(56) References Cited

U.S. PATENT DOCUMENTS

| | | | | |
|---|---|---|---|---|
| 5,606,703 A | * | 2/1997 | Brady | G06F 9/4812 710/263 |
| 6,507,562 B1 | | 1/2003 | Kadansky et al. | |
| 6,937,576 B1 | | 8/2005 | Di Benedetto et al. | |
| 7,102,998 B1 | | 9/2006 | Golestani | |
| 7,124,180 B1 | | 10/2006 | Ranous | |
| 7,171,484 B1 | * | 1/2007 | Krause | G06F 9/544 709/232 |
| 7,555,549 B1 | * | 6/2009 | Campbell | H04L 12/6418 709/223 |
| 2002/0010844 A1 | * | 1/2002 | Noel | G06F 9/5077 711/153 |
| 2002/0035625 A1 | | 3/2002 | Tanaka | |
| 2002/0150106 A1 | * | 10/2002 | Kagan | H04L 49/90 370/395.6 |
| 2002/0152315 A1 | * | 10/2002 | Kagan | H04L 49/90 709/228 |
| 2002/0152327 A1 | * | 10/2002 | Kagan | H04L 49/90 709/250 |
| 2002/0152328 A1 | * | 10/2002 | Kagan | G06F 9/546 709/250 |
| 2003/0018828 A1 | * | 1/2003 | Craddock | G06F 13/385 719/321 |
| 2003/0061417 A1 | * | 3/2003 | Craddock | G06F 9/546 710/54 |
| 2003/0065856 A1 | * | 4/2003 | Kagan | G06F 13/387 710/263 |
| 2004/0062258 A1 | * | 4/2004 | Grow | H04L 69/324 370/412 |
| 2004/0123071 A1 | * | 6/2004 | Stefan | G06F 15/8061 712/22 |
| 2004/0252685 A1 | * | 12/2004 | Kagan | H04L 49/251 370/389 |
| 2005/0122329 A1 | * | 6/2005 | Janus | G06F 13/122 345/501 |
| 2005/0129039 A1 | * | 6/2005 | Biran | H04L 45/00 370/412 |
| 2005/0131865 A1 | * | 6/2005 | Jones | G06F 9/4881 |
| 2008/0126564 A1 | * | 5/2008 | Wilkinson | H04L 12/64 709/242 |
| 2008/0168471 A1 | * | 7/2008 | Benner | H04L 49/90 719/314 |
| 2008/0288949 A1 | * | 11/2008 | Bohra | G06F 9/4881 718/104 |
| 2009/0037377 A1 | | 2/2009 | Archer et al. | |
| 2009/0182814 A1 | * | 7/2009 | Tapolcai | H04L 67/104 709/205 |
| 2009/0292905 A1 | | 11/2009 | Faraj | |
| 2011/0258245 A1 | | 10/2011 | BlockSome et al. | |
| 2012/0063436 A1 | | 3/2012 | Thubert et al. | |
| 2012/0117331 A1 | * | 5/2012 | Krause | G06F 12/0815 711/141 |
| 2013/0159410 A1 | | 6/2013 | Lee | |
| 2016/0299872 A1 | | 10/2016 | Vaidyanathan et al. | |

* cited by examiner

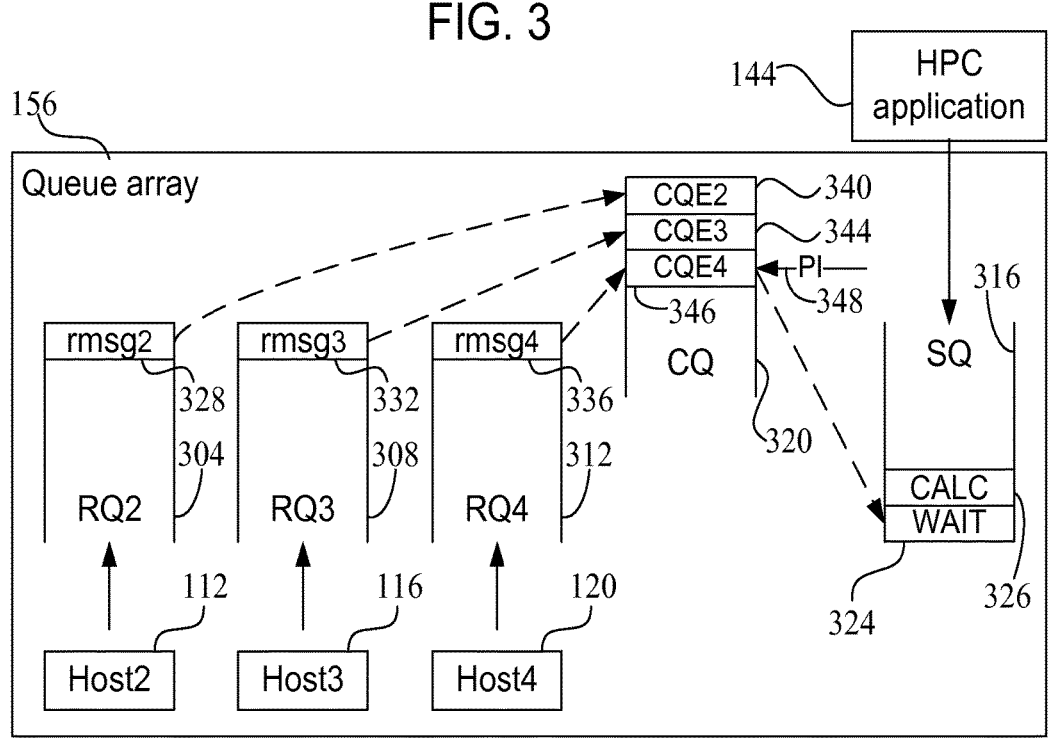
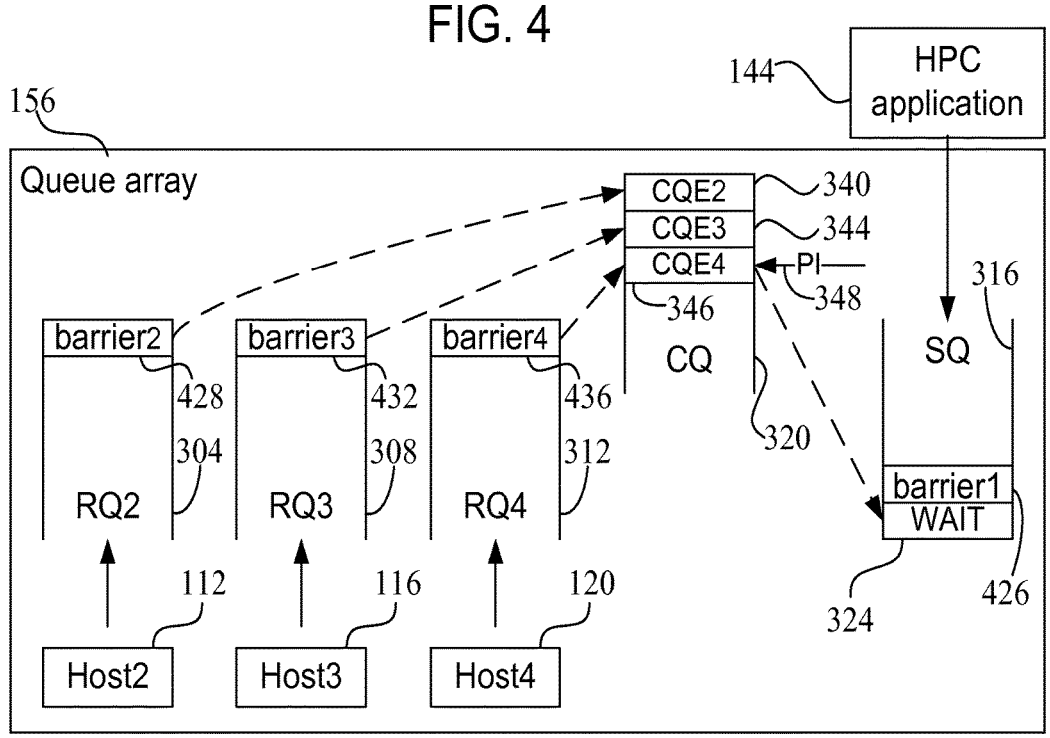

NETWORK OPERATION OFFLOADING FOR COLLECTIVE OPERATIONS

CROSS-REFERENCE TO RELATED APPLICATIONS

This application is a continuation-in-part of U.S. patent application Ser. No. 14/324,246, filed Jul. 7, 2014, which in turn is a continuation of U.S. patent application Ser. No. 12/945,904 (now U.S. Pat. No. 8,811,417), filed Nov. 15, 2010, which claims the benefit of U.S. Provisional Patent Application 61/261,339, filed Nov. 15, 2009, whose disclosure is incorporated herein by reference.

FIELD OF THE INVENTION

The present invention relates generally to computer networks, and particularly to application communication over computer networks.

BACKGROUND OF THE INVENTION

Operation of computers in High Performance Computing (HPC) environment often involves fast execution of collective operations. A commonly used Application Programming Interface (API) for initiating collective operations in HPC environment is specified by the Message-Passing Interface (MPI) forum in "MPI: A Message-Passing Interface Standard," version 2.2, Sep. 4, 2009, which is incorporated herein by reference.

Computers and storage devices in HPC environment commonly interconnect through a switched network that is specified by the InfiniBand Trade Association in "InfiniBand™ Architecture Specification," release 1.2.1, January, 2008, which is incorporated herein by reference.

SUMMARY OF THE INVENTION

An embodiment of the present invention that is described herein provides a Network Interface (NI), including:

a host interface, which is configured to receive from a host processor of a node one or more work requests that are derived from an operation to be executed by the node;

a plurality of work queues for carrying out transport channels to one or more peer nodes over a network; and control circuitry, which is configured to accept the work requests via the host interface, and to execute the work requests using the work queues by controlling an advance of at least a given work queue according to an advancing condition, which depends on a completion status of one or more other work queues, so as to carry out the operation.

In some embodiments, the operation includes a collective operation to be executed by the node together with the one or more peer nodes. In an embodiment, the operation is initiated by one or more Message Passing Interface (MPI) commands. In a disclosed embodiment, the MPI commands include non-blocking commands. In another embodiment, the operation is initiated by one or more Shared Memory (SHMEM) commands. In yet another embodiment, the control circuitry is configured to control the advance of the given work queue by holding the given work queue in a wait state until verifying that the advancing condition is met.

In some embodiments, the NI includes a computation unit that is configured to execute a calculation that is specified in the work requests, and the control circuitry is configured to send one or more results of the calculation to at least one target. The calculation may include at least one operation selected from a group of operations including maximum, minimum, sum, product, logical AND, bit-wise AND, logical OR, bit-wise OR, logical exclusive OR (XOR), and bit-wise exclusive OR (XOR). Additionally or alternatively, the calculation may include arguments of at least one data type selected from a group of data types including a vector that is contiguously organized in memory, a vector that is non-contiguously organized in memory and a multidimensional vector. In some embodiments, the target includes a peer node. In alternative embodiments, the target includes a host memory.

In an embodiment, the control circuitry is configured to control the advance of the given work queue by enabling sending to a peer node a message that is stored at a head of the given work queue only upon fulfillment of the advancing condition. In another embodiment, the control circuitry is configured to control the advance of the given work queue by enabling receiving in the given queue a message from a peer node only upon fulfillment of the advancing condition. In yet another embodiment, the control circuitry is configured to estimate the completion status of the other work queues according to one or more counting objects that are indicative of the completion status.

In some embodiments, the network includes an Infiniband network and the work queues include Infiniband work queues. In some embodiments, the NI includes one or more completion queues, and the control circuitry is configured to estimate the completion status of the other queues according to the completion status of the one or more completion queues. In an embodiment, the control circuitry is configured to reuse at least one of the work queues for carrying out multiple transport channels over the at least one work queue. In another embodiment, the control circuitry and the work queues are included in a chip-set. In yet another embodiment, the control circuitry and the work queues are included in a single chip.

There is additionally provided, in accordance with an embodiment of the present invention, a method, including:

in a Network Interface (NI) that includes a plurality of work queues for carrying out transport channels to one or more peer nodes over a network, receiving from a host processor of a node one or more work requests that are derived from an operation to be executed by the node; and executing the work requests using the work queues by controlling an advance of at least a given work queue according to an advancing condition, which depends on a completion status of one or more other work queues, so as to carry out the operation.

There is also provided, in accordance with an embodiment of the present invention, a computer software product, including a computer-readable storage medium in which program instructions are stored, which instructions, when read by a computer, cause the computer to receive from a host processor of a node one or more work requests that are derived from an operation to be executed by the node, and to execute the work requests using a plurality of work queues by controlling an advance of at least a given work queue according to an advancing condition, which depends on a completion status of one or more other work queues, so as to carry out the operation.

The present invention will be more fully understood from the following detailed description of the embodiments thereof, taken together with the drawings in which:

BRIEF DESCRIPTION OF THE DRAWINGS

FIGS. 3-5 are flow diagrams that schematically illustrate examples of collective operation offloading, in accordance with embodiments of the present invention.

DETAILED DESCRIPTION OF EMBODIMENTS

Overview

Figure 1:
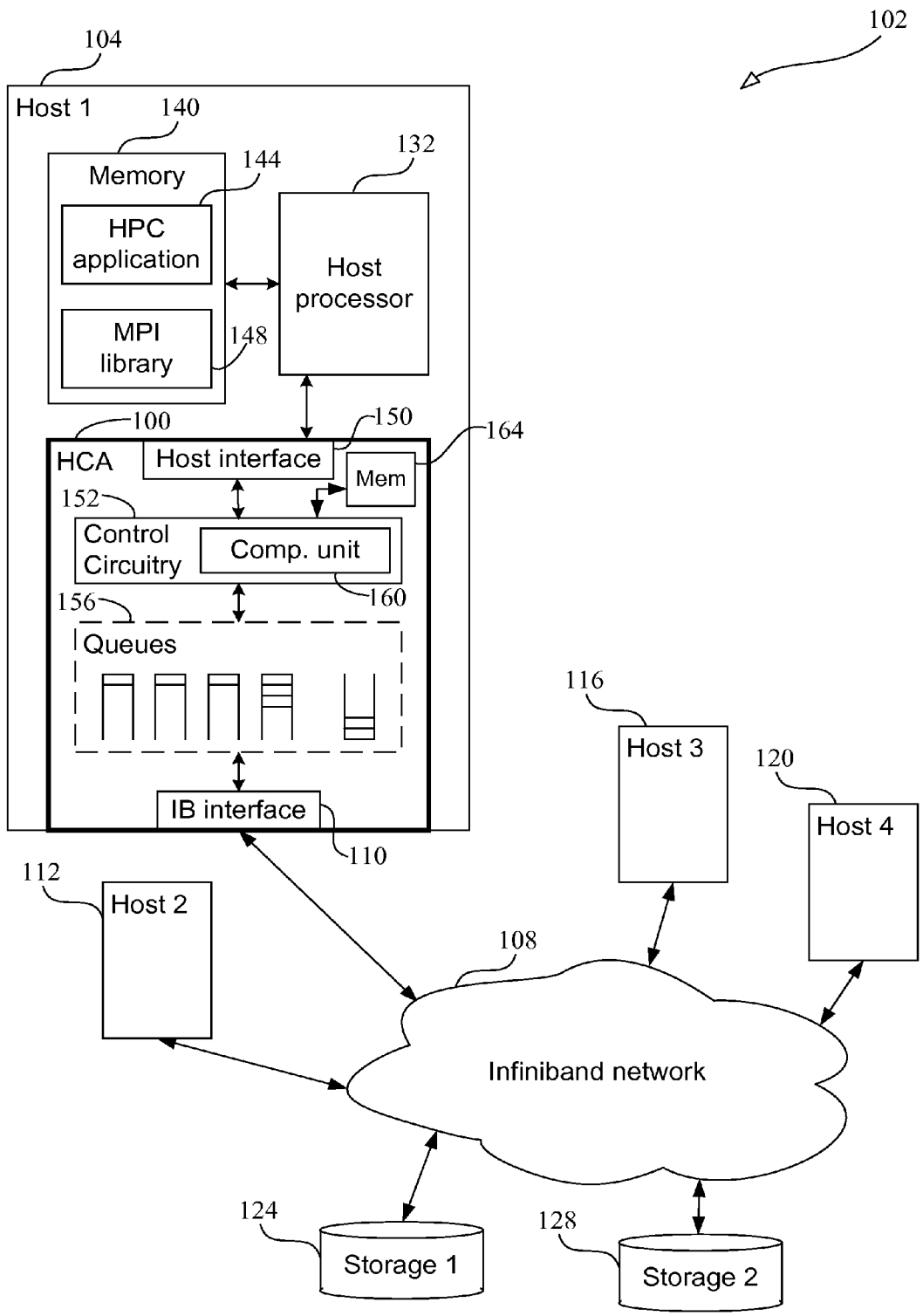
FIG. 1 is a block diagram that schematically illustrates a Host Channel Adaptor (HCA) in a HPC environment, in accordance with an embodiment of the present invention.

An aspect of some embodiments of the present invention relates to an IB Host Channel Adaptor (HCA), typically implemented in a Network Card (NIC) directly connected to a host server, which is configured to allow suspending the handling of tasks until a condition is met. The condition may depend, for example, on a completion status of another task of the HCA, on a value of a variable in the host memory or on a local or global time.

Embodiments of the present invention provide improved data communication and computation methods and devices for use in parallel computing environments such as High Performance Computing (HPC) systems, which in particular achieve fast execution of collective operations. In the described embodiments, host servers issue Message Passing Interface (MPI) collective operation commands that perform the collective operations over Infiniband (IB) switched networks. In an embodiment, an IB Host Channel Adaptor (HCA) is typically implemented in a Network Card (NIC) that is directly connected to a host server. The HCA communicates with other nodes, such as servers and storage systems, over an IB network, in a HPC environment. The disclosed techniques provide fast and host CPU independent execution of the collective operations by offloading a considerable part of the associated processing burden from the host processor to the NIC. The offloaded part is executed by the NIC without the need for software intervention, and therefore the effect of Operating System (OS) noise on the communication is mitigated. This sort of offloading is especially important for collective operations in large systems.

In an embodiment, a HPC application runs on a host server and issues collective operations that necessitate fast messaging transfer and accurate synchronization in time among multiple hosts. The collective operations are converted by the host software to "collective work requests," shortly denoted "requests," and respective control commands, which the host processor transfers to the HCA.

The HCA typically comprises multiple Work Queues (WQs). Each WQ comprises Work Queue Entries (WQEs), wherein each WQE comprises an information element that is related to one or more network events such as send/receive messages to/from peer nodes. A typical WQE may comprise, for example, a received message, a message to be transmitted, a Direct Memory Access DMA descriptor, a collective request or a portion thereof. For example, a collective request may be broken down into multiple primitives by the host processor, such that each WQE comprises a respective primitive.

The WQs are arranged in Queue Pairs (QPs), wherein each pair comprises one Receive Queue (RQ) and one Send Queue (SQ). A RQ typically queues receive related WQEs and a SQ typically queues send related WQEs. A QP is normally associated with a corresponding QP in a peer node, thus creating a point-to-point transport channel for message transfer. The HCA comprises Completion Queues (CQ), which reflect the completion status of WQEs by virtue of associating each CQ entry with a corresponding WQE. A Producer Index (PI) points to the last completed entry in a CQ or to the last posted WQE in a WQ that is enabled for execution by the HCA.

In some embodiments, Control Circuitry (CC) within the HCA loads the collective work requests coming from the host to corresponding WQs and executes them. The request content and the respective control commands imply advancing conditions that condition the advance of some WQs on execution completion on other WQEs and/or on reception of peer messages in specified RQs. Thus, conditional operation is achieved in the HCA, which carries out the associated collective operations, thus offloading this burden from the host processor.

It is noted that the disclosed techniques are not limited to collective operations, and can be used for executing various other operation types. In other words, any operation to be performed by a node can be converted to conditional work requests, in which the advance of a WQ depends on one or more conditions, such as time readings, host memory values and/or the completion status of one or more other WQEs. The work requests are provided to the HCA for execution, thus offloading the host processor of the node from these tasks. When the operation to be performed by the node comprises a collective operation, the work requests are referred to as collective work requests.

In some embodiments, the offloading is achieved by having the CC execute requests that introduce cross channel dependency between the HCA WQs such as the following: In a WAIT request, the CC conditions the advance of a WQ on completion of some operations in another WQ. In a RECEIVE_ENABLE request, the CC conditions the advance of a certain RQ on reaching the RECEIVE_ENABLE request. In a SEND_ENABLE request, the CC conditions the advance of another SQ on reaching the SEND_ENABLE request. In a CALC request, the CC executes a predefined calculation upon reaching the CALC request. (Note that CALC is not a cross-channel operation by itself, however its execution often depends on execution of cross-channel requests). The above example requests are described and demonstrated in detail hereinbelow.

It is possible in principle to execute the above-described Input/Output (I/O) operations driven by the MPI collective operation commands in the host processor. Execution in the host, however, would significantly degrade HPC performance, for example due to Operating System (OS) noise, since in many systems the jitter caused by OS noise accumulates and becomes a major limiting factor of system performance. Offloading this I/O burden according to the disclosed techniques, as explained above and further detailed below, eliminates this performance degradation. Furthermore, eliminating host CPU intervention in communication tasks frees CPU resources, and therefore allows for better CPU performance in computational tasks. The performance improvement achieved by the disclosed techniques is also important when executing non-blocking collective operations without software intervention.

System Description

FIG. 1 is a block diagram that schematically illustrates an IB HCA 100 in a HPC environment 102, in accordance with an embodiment of the present invention. In the described embodiment a host server 104 is connected to an IB network 108 through an IB interface 110. Network 108 provides switched connectivity among the nodes that are connected to it, in the present example hosts 104, 112, 116 and 120, and storage systems 124 and 128. The following schematic description of host 104 typically represents the other hosts as well.

A host processor 132 runs a HPC application 144 that uses a memory 140 as a dynamic memory. The HPC application includes collective MPI commands that issue collective operations over network 108 by executing code modules of a MPI library 148. MPI library 148 is provided here as an example only; any other suitable libraries, such as Shared Memory (SHMEM), can be used as well in alternative embodiments.

In an embodiment, processor 132, using MPI library 148 code modules, converts the collective operation commands to collective work requests and respective control commands, and transfers them to HCA 100 through a host interface 150. (The distinction between collective work requests and control commands is described by way of example, and is not mandatory.) In an example embodiment, HCA 100 is implemented in a Network Interface Card (NIC). In alternative embodiments HCA 100 is implemented in a chip-set or a single chip. Control Circuitry (CC) 152 within HCA 100 receives the requests from processor 132, parses them and manages the HCA accordingly, as explained hereinafter.

Queues 156 comprise IB queues, such as RQs, SQs, and CQs, which are further detailed hereinafter. CC 152 loads the requests coming from the host to corresponding WQs and executes them. The WQEs content and the respective control commands imply control criteria according to which the CC controls the WQs. In particular, the CC conditions the advance of a given WQ on completion of WQEs execution on other WQs, and/or on reception of messages from peer nodes in some RQs through interface 110. Thus the HCA enforces cross-channel operations, which carry out the collective operation commands that were specified in the work requests as explained above.

In an embodiment, CC 152 further comprises a computation unit 160, which is configured in some embodiments as an Arithmetic Logic Unit (ALU), for performing calculations that are specified by the requests. Computation unit 160 can be embedded within the CC, or it can be implemented separately within the HCA and controlled by the CC. A memory unit 164 is connected to CC 152 and serves to store code and data that the CC and the computation unit use.

CC 152 and computation unit 160 are realized in an embodiment in hardware, which may comprise Field-Programmable Gate Arrays (FPGAs) and/or Application-Specific Integrated Circuits (ASICs). CC 152 may also comprise a programmable element comprising one or more dedicated or general-purpose processors, which run software for carrying out the methods described herein. The software may be downloaded to the processors in electronic form, over a network, for example, or it may, alternatively or additionally, be provided and/or stored on non-transitory tangible media, such as magnetic, optical, or electronic memory. Queues 156 and memory 160 are typically implemented in a random access memory such as Static Random Access Memory (SRAM) or Dynamic Random Access Memory (DRAM), which may be embedded within the CC or assembled separately in the HCA. In some embodiments WQs are stored in the host memory and part of them is cached in to the HCA.

Interface 110 may comprise multiple IB ports connected to multiple ports of network 108, thus achieving multiple simultaneous paths through the network. The disclosed offloading techniques may be applicable as well to transport technologies other than IB. For example, the disclosed cross channel operations may be applicable to Ethernet, RDMA over Converged Ethernet (RoCE) and other suitable interfaces. The configuration of HCA 100 shown in FIG. 1 is an example configuration, which is chosen purely for the sake of conceptual clarity. In alternative embodiments, any other suitable HCA configuration can also be used. HCA and host elements that are not mandatory for understanding the disclosed techniques were omitted from the figure for the sake of clarity.

Offloading Method Description

Figure 2:
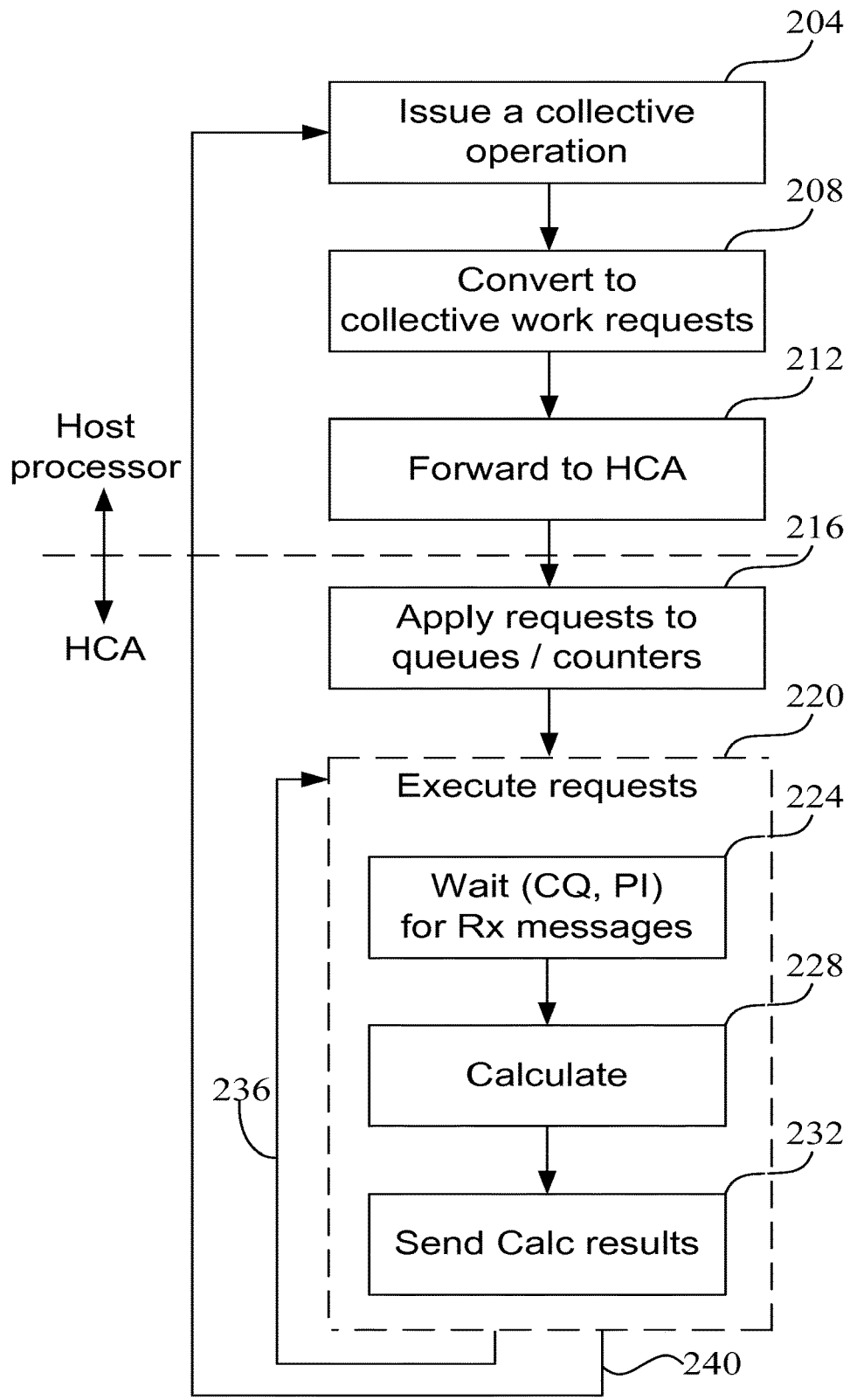
FIG. 2 is a flowchart that schematically illustrates a method for offloading collective operations, in accordance with an embodiment of the present invention.

FIG. 2 is a flowchart that schematically illustrates a method for offloading collective operations, in accordance with an embodiment of the present invention. The method begins with an issuing step 204, wherein HPC application 144 initiates a collective operation by issuing a collective operation command such as MPI_BARRIER, MPI_SCATTER, MPI_GATHER, MPI_REDUCE, MPI_MAX, MPI_MIN, MPI_SUM, MPI_PROD, MPI_LAND, MPI_BAND, MPI_LOR, MPI_BOR, MPI_LXOR, MPI_BXOR, MPI_MAXLOC and MPI_MINLOC, as defined in the MPI standard, cited above. The above collective operation commands are provided here as an example only. Other collective operation commands and libraries, e.g. SHMEM, are applicable as well.

At a conversion step 208, host processor 132 converts the collective operation command to work requests using code modules of MPI library 148. Sample request execution is exemplified hereinafter. At a forwarding step 212, processor 132 forwards the requests to HCA 100 via host interface 150 after adapting them to the HCA format using an appropriate HCA driver code. At an application step 216, HCA 100 (e.g., using CC 152) applies the requests to WQs, CQs, counters and any other relevant logic in the HCA.

At an execution step group 220, execution of the work requests is illustrated by example requests WAIT and CALC. Request execution is illustrated in more detail in FIGS. 3-5 below. At a waiting step 224, CC 152 exerts the WAIT request by holding a given WQ in a wait state until reception of messages from some specified peer nodes.

In one embodiment, the CC identifies reception of the awaited messages by sensing a PI of a CQ, wherein the CQ is associated with a predetermined group of RQs that are configured to accept the awaited messages. (Alternative implementations, e.g., using counters, are described further below.) At a calculation step 228, which is conditioned on exiting the wait state, computation unit 160 carries out a calculation that is specified by the CALC request. At a sending step 232, CC 152 sends the calculation results to peer nodes through IB interface 110 over IB network 108.

A loopback 236 signifies a transition, managed by CC 152, to the next WQE in a given WQ. A loopback 240 depicts indication to host processor 132 that the collective operation has been terminated and a transition to the next collective operation. Loopback 240 emphasizes the fact that the host is not involved in the execution of a collective operation once it is transferred to HCA 100 in step 212. The above loopbacks illustrate request and operation sequencing. However, in an embodiment, CC 152 typically manages multiple sequences of collective operations and requests concurrently. The flowchart shown in FIG. 2 is an example flowchart, which is chosen purely for the sake of conceptual clarity. In alternative embodiments, any other suitable flowchart can also be used for realizing the disclosed methods.

Collective Request Examples

FIG. 3 is a flow diagram that schematically illustrates example execution of WAIT and CALC requests, in accordance with an embodiment of the present invention. Queues 156 comprise RQs RQ2 304, RQ3 308 and RQ4 312, a SQ 316 and a CQ 320. RQs 304, 308 and 312 are configured to receive messages from peer hosts 112, 116 and 120, respectively. CC 152, not shown in the figure, queues WAIT and CALC requests, denoted 324 and 326, respectively, in SQ 316. These requests were originally originated from HPC application 144. A typical syntax of the WAIT request is WAIT(CQ, PI). The "WAIT" instructs CC 152 to halt the advance of the WQ in which the WAIT request is queued, SQ 316 in the present example. The CC thus holds SQ 316 in a wait state. The CQ and PI parameters specify for the CC a condition for resuming SQ 316 advance. The condition is, in the present example, that a PI 348, which points CQ 320, reaches the position that is depicted in the figure. Processor 132 further instructs CC 152, upon providing it with the WAIT request, to assign CQ entries CQE2 340, CQE3 344 and CQE4 346 to received messages 328, 232 and 336. Upon reception of the above messages, at any time order, PI 348 reaches CQE4 346 position. This position of PI 348 constitutes an indication for CC 152, that SQ 316 advance shall be resumed.

In alternative embodiments of the WAIT request, the CC may queue it in any WQ and condition it on any other WQ. In an embodiment, CC 152 polls the other WQ, or any other suitable indication, for verifying whether the wait condition has been met. In alternative embodiments, the indication may actively notify the CC when an awaited condition is met, by an interrupt, doorbell or any other suitable mechanism.

Upon resuming SQ 316 advance, CC 152 executes a CALC request, denoted 326, which follows WAIT request 324, while the CALC uses the data received in RQs 304, 308 and 312. CALC is a calculation type request comprising a typical syntax: CALC(Opcode, List of argument addresses, Target addresses). CC 152 executes the calculation that is specified by the request opcode, by means of computation unit 160, on arguments whose addresses in memory 164 are specified in the request. The specified targets, to which CC 152 will send the CALC results, are typically one or more peer nodes over network 108, and/or an address in host memory 140. At this point the CALC collective operation is completed, and the CC reports it to the host processor by means of a predefined CQ, which is not shown in the figure for the sake of simplicity.

Example CALC operations are: maximum, minimum, sum, product, logical AND, bitwise AND, logical OR, bitwise OR, logical exclusive OR (XOR), bit-wise exclusive OR (XOR), or any other suitable operation. When the CALC opcode is "minimum" or "maximum", an index can be attached to each argument, and the index of the result will be that of the minimal argument (for minimum operation), or that of the maximal argument (for maximum operation). CALC results can be posted on either Datagram or connection oriented SQ.

Arguments of CALC operation can be of various data types, including vectors. A vector of N elements is denoted in this description V[N]. A collective operation may involve many vectors Vi[N] that reside in multiple nodes over network 108, which compose a general vector R[N]. In an embodiment, the elements of vector V[N] may be stored in HCA memory 164 in either contiguous memory addresses or in non-continuous addresses, for example having a fixed "stride" in the memory between adjacent elements. In alternative embodiment, V[N] and R[N] may be of any dimension. In other embodiments, however, CALC operations may comprise any other suitable data types.

FIG. 4 is a flow diagram that schematically illustrates execution of WAIT request in accordance with an embodiment of the present invention. FIG. 4 differs from FIG. 3 in the type of the messages that HCA 100 receives from the peer hosts. Here, the received messages 428, 432 and 436 are barrier messages, which are used for host synchronization over network 108, as part of MPI_BARRIER operation. This is in contrast to the received messages in FIG. 3 that carry data to be processed by the CALC request. Correspondingly, a message 426 is a barrier message that host 1 will send to other nodes over the network upon receiving messages 428, 432 and 436.

Figure 5:
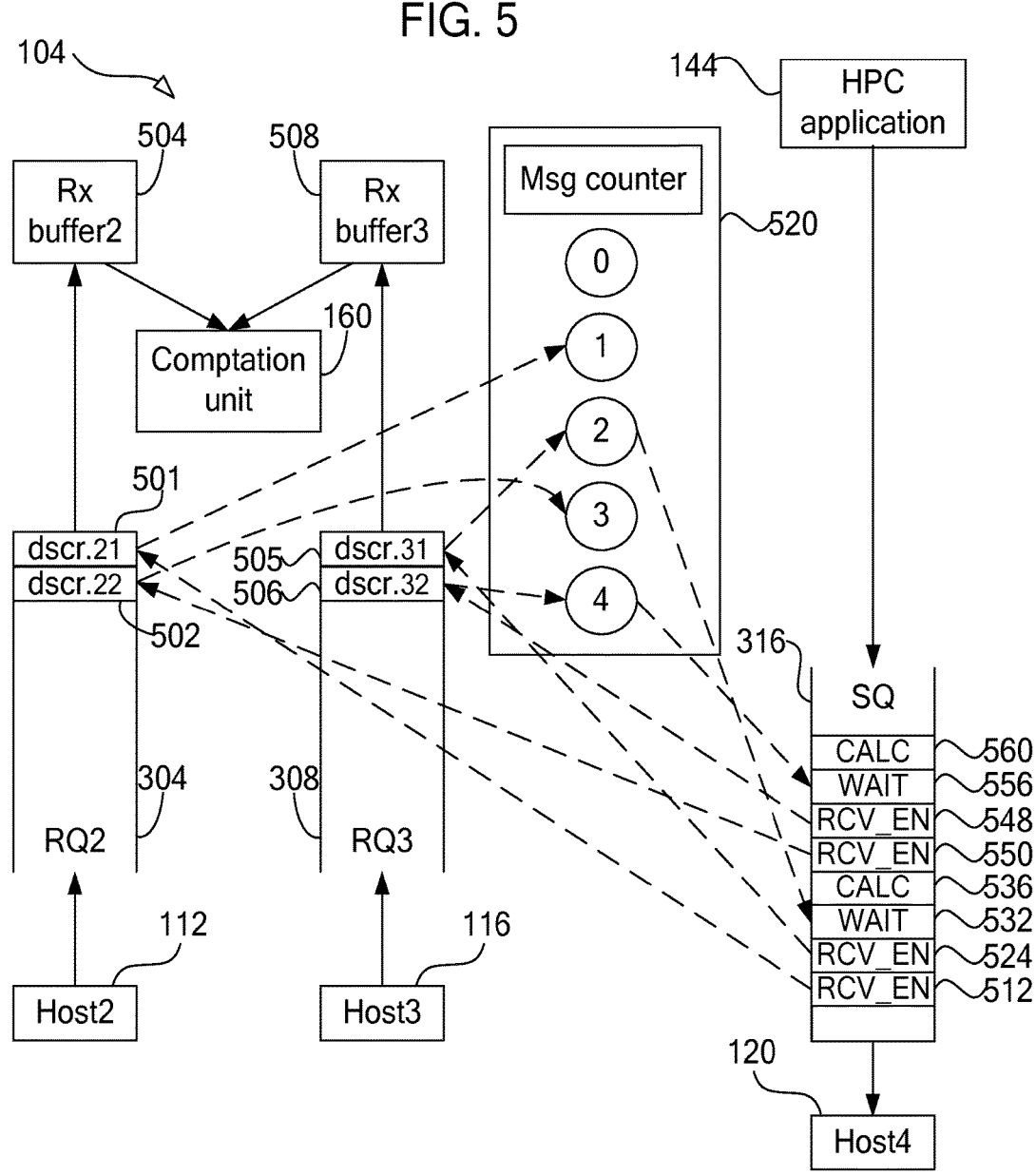

FIG. 5 is a flow diagram that schematically illustrates a synchronized use of receive buffers within HCA 100 for cross channel calculations, in accordance with an embodiment of the present invention. RQ2 304 is loaded with DMA descriptors 501 and 502, both pointing to a Rx buffer 504 in memory 164. When the software posts these receive WQEs, it does not enable them (i.e., does not increase the RQ Producer Index—PI). Correspondingly, a RQ3 308 is loaded with DMA descriptors 505 and 506, both pointing to a Rx buffer 508 (disabled as well). RQ2 and RQ3 are configured to receive messages from peer hosts 112 and 116, respectively. CC 152 loads RQs 304 and 308, as well as a SQ 316, and also sets their status, according to instructions from host 104 following a collective operation that was initiated by HPC application 144.

In particular, CC 152 sets RQs 304 and 308 entries in a disabled status. This setting disables reception of messages from the network into RQs 304 and 308 until disabled WQEs are enabled by RECEIVE_EN requests, as explained hereinafter.

CC 152 loads a request, denoted as "RECEIVE_EN(QP, PI)" in WQEs 512, 524, 540 and 548 of SQ 316. RECEIVE_EN(QP, PI), when executed, enables reception of messages into the RQ of the specified QP, in the WQE that is specified by PI. Until the RECEIVE_EN execution, any message that arrives from a peer node and targets the specified WQE would be discarded, and the peer would be notified about this discard, provided that the status of that WQE was set as disabled before the RECEIVE_EN execution. The above enabling is illustrated in FIG. 5, by dashed arrows going from WQEs 512, 524, 540 and 548 to WQEs 501, 505, 502 and 506 respectively. Some embodiments also implement a RECEIVE_EN(QP) version of the receive enabling request, wherein the specified RQ is advanced by a single increment of its corresponding PI.

FIG. 5 illustrates a sequence of operations that begins with enabling WQEs 501 and 505 by WQEs 512 and 524 respectively. Then CC 152 halts the advance of SQ 316 due to WAIT request 532 that is conditioned on a control counter 520 (or similar counting object) reaching state "2". When RQ2 304 receives a message from host 112, CC 152 transfer this message to Rx buffer 2 504, according to descriptor 501, and advances counter 520. When RQ3 308 receives a message from host 116 CC 152 transfer this message to Rx buffer 3 508 according to descriptor 505 and advances counter 520.

Following reception of both messages, counter 520 reaches state is "2", which causes CC 152 to advances SQ 316, thus executing CALC request 536. This advancing condition is depicted by a dashed arrow from the counter state "2" to WQE 532. The CALC causes CC 152 to execute, by means of computation unit 160, a calculation that is specified by the CALC, using parameters that reside in buffers 504 and 508. The data in the buffers is not affected by succeeding messages that RQs 304 and 308 may receive during the calculation, since WQEs 502 and 506 are still in a disabled status.

In an embodiment, CC 152 sends the CALC results to other nodes over network 108, as depicted in FIG. 5 by the line from SQ 316 to host 120. In alternative embodiments CC 152 may send the CALC results to host processor 132 or to host memory 140. CC 152 completes CALC 536 operation it advances SQ 316, thus exerting RCV_EN 540 and 548, and sets SQ 316 in a wait state due to WAIT request 556. RCV_EN 540 and 548 enable descriptors 502 and 506 respectively, thus allowing advance of counter 520 to state 4 upon receiving additional two messages from hosts 112 and 116 respectively. CC 152 then advances SQ 316 over WAIT request 556, which is conditioned on counter state 4, thus allowing execution of CALC 560, which reuses Rx buffers 504 and 508. FIG. 5 shows, in principle, two non-blocking REDUCE collective operations over a tree: Messages, which include data, from hosts 112 and 116, are reduced by host 104 to one message, which includes CALC results based on that data, destined to host 120.

Another example for the usage of the RECEIVE_EN request is an implementation of a PIPELINE operation. In a PIPELINE operation, a large message (e.g., 1 MB) is to be sent to a destination node via an intermediate node. In some embodiments, the intermediate node comprises several (e.g., four) small buffers (e.g., 8 KB each), which serve as a pipeline. Before sending the large message to the intermediate node, the message is broken down into multiple 8 KB messages, and the 8 KB messages are sent to the intermediate node.

Once an 8 KB message arrives in the intermediate node, it occupies one of the above-described buffers (making it non-valid to receive another message). The relevant SEND WQE (that points to this buffer) is enabled by SEND_EN WQE once sending is completed, and the data in the buffer is no longer needed in the intermediate node. The buffer is enabled again by RECEIVE_EN for enabling reception of a new message on this buffer.

Note that the number of WQEs to be post to the queues in the pipeline implementation is on the order of the original message size (1 MB in the example above) divided by the size of the small message (8 KB in the example above). This number can be quite large. In alternative embodiments to the pipeline implementation, the software does not generate this large number of WQEs. This task is offloaded to the NIC hardware. The software will use a WQE of type PIPE. For example:
PIPE(receive_qp_number, send_qp_number, intermediate_buffer_list, number_of_messages).

In alternative embodiments a given control counter, such as counter 520, may be incremented upon arrival of a message that indicates increment of the given counter. In further alternative embodiments, the counter to be incremented upon reception of a message is not a property of the QP but is set by the send WQE. Using this technique, different WQEs on the same SQ that send messages to the same RQ will cause different counters to increment based on the counter_id parameter in the send WQE. In further alternative embodiments, the number of QPs that are depicted in FIGS. 3-5 may be significantly reduced by dynamically carrying out multiple transport channels with one work queue, thus providing a Dynamically Connected Transport (DCT) service mode. A transport service of this sort is described in U.S. patent application Ser. No. 12/621, 523, which is assigned to the assignee of the present patent application and whose disclosure is incorporated herein by reference.

In the extreme case of this approach the CC dynamically allocates a single QP, comprising a RQ and a SQ, and a single CQ, for implementing different transport channels that are involved in collective operations that HPC application 144 initiates. The CC then applies all the cross-channel operations that are illustrated in FIGS. 3, 4 and 5 to the single QP and single CQ. The only resource that scales when HCA 100 offloads multiple concurrent collective requests is the number of counters.

The flow diagrams that are illustrated in FIGS. 3-5 are example diagrams, which were chosen purely for the sake of conceptual clarity. In alternative embodiments, other suitable applications and cross channel requests can also be used for realizing the disclosed methods. As an example, a SEND_EN(QP, PI) request may be applied for enabling a send message event, wherein the message is stored at or pointed by the head WQE of a given SQ, following, e.g., receiving and processing messages from a predefined group of peer nodes. Some embodiments also implement a SEND_EN(QP) version of the send enabling request, wherein the specified SQ is advanced by a single increment of its corresponding PI.

Although the embodiments described herein mainly address offloading of collective operations in HPC environment, the methods and systems exemplified by these embodiments can also be used in other applications that involve computer networks and clusters, such as message gathering and distribution.

Furthermore, the WAIT request may depend on other parameters than those dependent on other work queues. For example, a WAIT request may depend on a local or global time, for example requiring to wait for a predetermined time period or to wait until a specific time point is reached. The time may be managed internally within the NIC or may be received from an external unit. Waiting for a specific time or passage of a time period may be used to synchronize acts of the NIC with other events of the system which are performed at known times.

In other embodiments, the wait request depends on host memory values, such as memory values which are indicative of completion of a calculation or occurrence of any other event.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A Network Interface (NI) device, comprising:
a host interface, which is configured to communicate with a host processor and a host memory of a node of a network;
a network interface, which is configured to be coupled to the network; and
circuitry, which is coupled between the host interface and the network interface and is configured to:
execute operations prescribed by work queue entries from multiple work queues that correspond to transport channels between the node and one or more peer nodes on the network, when a wait work queue entry in a specific work queue of the multiple work queues is executed, halt advance of the specific work queue, while continuing to execute operations prescribed by work queue entries from others of the multiple work queues, until a condition dependent on a value is met; and resume advance of the specific work queue so as to enable execution of operations prescribed by work queue entries in the specific work queue, responsive to identifying that the condition dependent on the value is met.

2. The NI device according to claim 1, wherein the circuitry is configured to poll an indication of whether a condition required for execution of operations prescribed by the work queue entries of the specific work queue is met, while the advance of the specific work queue is halted, to determine when the condition required for execution of operations is met.

3. The NI device according to claim 1, wherein the circuitry is configured to reuse at least one of the multiple work queues for carrying out multiple transport channels over the at least one of the multiple work queues.

4. The NI device according to claim 1, wherein the circuitry identifies that the condition dependent on the value is met by receiving an indication through a doorbell of the NI device.

5. The NI device according to claim 1, wherein the circuitry identifies that the condition dependent on the value is met by receiving an interrupt.

6. The NI device according to claim 1, wherein the circuitry is configured to disable execution of operations prescribed by work queue entries of the specific work queue by not increasing a producer index for the specific work queue.

7. The NI device according to claim 1, and comprising a computation unit that is configured to execute a calculation that is specified in a work queue entry in a work queue.

8. The NI device according to claim 7, wherein the calculation comprises determining a maximum or minimum.

9. The NI device according to claim 7, wherein the calculation comprises logical AND, bit-wise AND, logical OR, bit-wise OR, logical exclusive OR (XOR), or bit-wise exclusive OR (XOR).

10. The NI device according to claim 7, wherein the calculation comprises arguments of at least one data type selected from a group of data types comprising a vector that is contiguously organized in memory, a vector that is non-contiguously organized in memory and a multidimensional vector.

11. The NI device according to claim 1, wherein the circuitry is configured to execute operations prescribed by a send queue, and wherein the circuitry is configured to disable execution of operations prescribed by work queue entries from the send queue.

12. The NI device according to claim 1, wherein the circuitry is configured to execute operations prescribed by a receive queue, and wherein the circuitry is configured to disable execution of operations prescribed by work queue entries from the receive queue, and to reject a message received by a disabled receive queue.

13. The NI device according to claim 1, wherein the condition dependent on the value comprises a condition dependent on a value indicative of completion of acts in a second work queue.

14. The NI device according to claim 13, wherein the circuitry is configured to identify that the condition dependent on the value indicative of completion actions in the second work queue is met according to a status of one or more completion queues.

15. The NI device according to claim 13, wherein the condition dependent on the value indicative of completion acts in the second work queue comprises a condition on a counter of elements in the second work queue.

16. The NI device according to claim 13, wherein the condition dependent on the value indicative of completion acts in the second work queue comprises a condition on a position of an index pointer of one of the multiple work queues.

17. The NI device according to claim 13, wherein the condition dependent on the value indicative of completion acts in the second work queue comprises a condition on a position of an index pointer of a completion queue.

18. The NI device according to claim 1, wherein the condition dependent on the value comprises a condition dependent on a value in the host memory.

19. A method, comprising:
using a Network Interface (NI) device that is coupled between a network and a host processor and a host memory of a node, executing operations prescribed by work queue entries from multiple work queues that correspond to transport channels between the node and one or more peer nodes on the network;

when a wait work queue entry in a specific work queue of the multiple work queues is executed, halting advance of the specific work queue, while continuing to execute operations prescribed by work queue entries from others of the multiple work queues, until a condition dependent on a value of a specific variable is met; and resuming advance of the specific work queue, enabling execution of operations prescribed by work queue entries in the specific work queue, responsive to identifying that the condition dependent on the value of the specific variable is met.

20. The method according to claim 19, comprising polling an indication of whether a condition required for execution of operations prescribed by the work queue entries of the specific work queue is met, while advance of the specific work queue is halted, to determine when the condition required for execution of operations prescribed by the work queue entries of the specific work queue is met.

21. The method according to claim 19, comprising executing a calculation that is specified in one or more of work queue entries, and sending one or more results of the calculation to at least one target.

22. The method according to claim 21, wherein the calculation comprises arguments of at least one data type selected from a group of data types comprising a vector that is contiguously organized in memory, a vector that is non-contiguously organized in memory and a multidimensional vector.

* * * * *